Patented Jan. 28, 1947

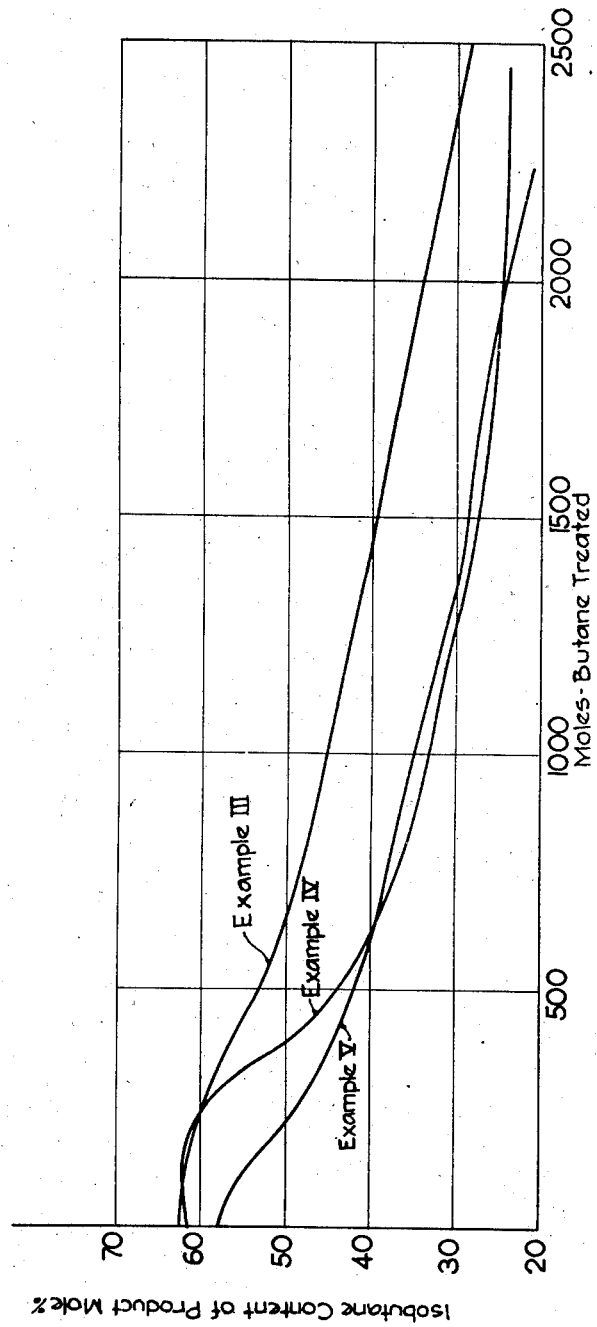

2,415,061

UNITED STATES PATENT OFFICE 2,415,061

VAPOR PHASE ISOMERIZATION OF HYDROCARBONS

Martin de Simo, Chicago, Ill., and Frank M. McMillan, Berkeley, Calif., assignors to Shell Development Company, San Francisco, Calif., a corporation of Delaware Application June 6, 1942, Serial No. 446,094

8 Claims. (Cl. 260—683.5)

This invention relates to a process for the production of isoparaffin hydrocarbons from the corresponding normal paraffin hydrocarbons by vapor phase catalytic isomerization.

It has long been known that aluminum chloride and aluminum bromide, in the presence of certain promoters are capable of catalyzing the isomerization of hydrocarbons such as pentane, hexane, heptane, octane, cyclohexane and the like into their corresponding branched chain isomers. More recently it was found that these catalysts are also capable of causing the isomerization of normal butane to isobutane. In the case of pentane and its higher homologues these catalysts also tend to cause cracking and it is therefore advocated that these hydrocarbons be treated in the liquid phase at relatively low temperatures. In the case of butane, on the other hand, the tendency to crack under the influence of aluminum chloride or aluminum bromide is much less. This is undoubtedly connected with the fact that isobutane is a primary cracking product when higher hydrocarbons are cracked with these catalysts. Consequently it is both possible and practical to treat butane with these catalysts at relatively high temperatures in the vapor phase. Recently it was found that pentane and its higher homologues may also be treated in the vapor phase without excessive cracking by the use of certain degradation inhibitors. Suitable inhibitors so far found include hydrogen, certain metals, isobutane, and under certain conditions naphthenic hydrocarbons.

The practical vapor phase isomerization of these various isomerizable saturated hydrocarbons requires relatively short contact times. In order to produce practical conversions, catalysts of high activity are therefore required. Very suitable catalysts for this purpose have been developed. Suitable catalysts, for instance, comprise aluminum chloride or aluminum bromide promoted with a mineral material containing firmly bound water. Catalysts of this type have been prepared which are much more active than the aluminum chloride or aluminum bromide alone. The use of catalysts of this type is described and claimed in U. S. Patent No. 2,208,362. It has been found that of the available mineral promoters for aluminum chloride and aluminum bromide the most effective is adsorptive alumina. It has also been found that all aluminas are not equivalent as promoters for aluminum chloride and aluminum bromide and that alumina of the type of the "Activated Aumina" of commerce is particularly effective. Alumina of this type is prepared by partially dehydrating an alpha alumina trihydrate which in turn has been prepared by slow precipitation from an alkaline solution and consists predominantly of alpha alumina monohydrate. The isomerization of hydrocarbons with catalysts prepared with this type of alumina is described and claimed in copending application Serial No. 375,260 filed January 21, 1941, of which the present application is a continuation-in-part (now U. S. Patent No. 2,277,512).

Catalysts prepared by impregnating these various partially dehydrated carriers, such in particular as "Activated Alumina," when employed in the isomerization of isomerizable saturated hydrocarbons in the vapor phase have given excellent results. They are exceptionally active isomerization catalysts giving nearly equilibrium conversions of isomers even at very high space velocities. Furthermore they decline in activity quite slowly, thus producing large amounts of isomers per pound of catalyst before it is necessary to employ fresh catalyst.

It has further been found that the economy of the isomerization process using the above-described catalyst depends to a considerable extent upon the mode of preparation of the catalyst. Catalysts prepared by certain methods, although substantially equal in composition and catalytic activity, are capable of producing considerably greater quantities of branched chain hydrocarbons per pound of catalyst than others. One method of preparation of the isomerization catalyst is, for example, to heat the adsorptive alumina (for instance "Activated Alumina") with the required amount of aluminum chloride in a bomb. The finished catalyst contains all of the aluminum chloride adsorbed in the pores of the alumina and has the same appearance as the original alumina, but is highly active. Isomerization catalysts prepared by this method, however, are capable of producing only relatively small amounts of branched chain hydrocarbons per pound as compared with catalysts prepared by improved methods. This, it has been found, is due to the formation of hydrates in the catalyst. When, on the other hand, the isomerization is effected with catalysts prepared by impregnating the adsorptive alumina with aluminum chloride vapors under suitable conditions at substantially atmospheric pressure, larger amounts of branched chain hydrocarbons per pound of catalyst can be produced. This is due to the fact that in this method of preparation a consideration portion of the hydrates are decomposed during the catalyst preparation.

In view of the considerable improvement in the isomerization process possible by the use of catalysts prepared by improved methods, the possibility of further improvement in the isomerization by more complete elimination of aluminum chloride hydrates was investigated. It was found that substantially complete dehydration of the alumina by various heat treatments followed by impregnation with aluminum chloride vapors according to the preferred method, lead to catalysts having, in general, poor isomerization activity. It was found that the isomerization could be considerably improved, however, by reacting the water-containing carrier with aluminum chloride under conditions adapted to form and decompose hydrates of aluminum chloride and then impregnating in a second step with further amounts of aluminum chloride. The catalysts prepared by this improved method, although they are capable of producing larger amounts of branched chain hydrocarbons per pound of catalyst, still contain appreciable amounts of bound water which slowly reacts under the isomerization conditions and contributes to the eventual deactivation of the catalyst. It was found that under optimum conditions only a portion of the original water can be reacted with the aluminum chloride in the first steps of the catalyst preparation. This leaves a substantial part of the firmly-bound water in the catalyst.

We have now found that the vapor phase isomerization of these isomerizable saturated hydrocarbons may be effected more advantageously and economically by the use of special catalysts prepared by impregnating gamma alumina (which contains practically no bound water) with an effective amount of aluminum chloride. When effecting the isomerization with these catalysts the decline in the isomerization conversion due to the reaction of the aluminum chloride with firmly-bound water in the alumina is negligible.

The process of the invention is applicable to the vapor phase isomerization of any of the isomerizable saturated hydrocarbons, i. e. normally liquid vaporizable paraffins and naphthenes containing at least 4 carbon atoms, and mixtures thereof with one another or with non-isomerizable saturated hydrocarbons. Particular applications of the process are, for example, the isomerization of butane, pentane, and/or hexane in the vapor phase to form their corresponding branched chain isomers.

The conditions suitable for the vapor phase isomerization of these various hydrocarbons are generally known. Thus, the hydrocarbon to be isomerized is preferably substantially free of catalyst poisons such as sulfur compounds, nitrogen bases, unsaturated compounds and aromatic compounds.

In such cases where the tendency of the hydrocarbon to undergo degradation reaction is sufficient to adversely affect the process, one of the above-described degradation inhibitors is preferably employed.

The isomerization is preferably effected in the presence of a small amount of a promoter such as hydrogen chloride, hydrogen bromide, hydrogen fluoride, or boron fluoride. After the catalyst has declined in activity the concentration of promoter is preferably increased as described in Patent No. 2,274,624.

The temperature is sufficient to maintain the reactants as well as the reaction products in the vapor phase at the prevailing pressure, but is preferably not appreciably higher. Thus in the vapor phase isomerization of butane under pressures in the order of 9-12 atmospheres, the temperature is preferably between about 100° C. and about 130° C.

The isomerization may be effected under any described pressure, but is preferably effected under a substantial pressure consistent with the applied temperature for the reasons explained in Patent No. 2,208,362.

The space velocity may be in the conventional range of about 6-12 mols per liter catalyst per hour but also may be much higher. In the isomerization of butane and in the conditions shown in Example I below, for instance, excellent results have been obtained employing space velocities from 20 to 100 mols of butane per liter of catalyst per hour. Due to the high isomerizing activity of the catalyst, the conversions at these high space velocities are not much lower than at lower space velocities and the production capacity of a given volume of catalyst is very high.

It is also found that when employing the high space velocities applicable with the present catalyst, the concentration of promoter may be much higher throughout the process. Thus the isomerization may be initiated with such catalyst using a concentration of hydrogen chloride promoter above 10%, for instance 15%, at a space velocity of 30 mols per liter per hour or above. At lower space velocities such concentrations of promoter cause a rapid deactivation of fresh catalyst and can only be employed when the catalyst is considerably spent.

The catalysts employed in the process of the present invention are prepared by impregnating an alumina consisting essentially of gamma alumina with an effective amount of aluminum chloride. Alumina in the gamma form contains no water of constitution or hydration. It may be formed from alpha alumina trihydrate, beta alumina trihydrate, or alpha alumina monohydrate by thermal dehydration. The dehydration must however, be effected with much care since gamma alumina is an unstable form of alumina and under the usual calcination conditions is partially converted into the totally inactive alpha form. As stated above, "Activated Alumina" and products of similar characteristics, if carefully dehydrated to remove substantially all of the water and to convert the alpha alumina monohydrate to gamma alumina and then impregnated with aluminum chloride vapors in the above-described preferred manner, produce, in general, catalysts which are quite inferior to those prepared from the adsorptive alpha alumina monohydrate per se. It has now been found, however, that if the gamma alumina is impregnated with liquid aluminum chloride under pressure to introduce a sufficient concentration of aluminum chloride, the resulting catalyst becomes active for hydrocarbon isomerization. These catalysts, as will be pointed out more fully below, when employed for the vapor phase isomerization of saturated isomerizable hydrocarbons, afford several distinct advantages leading to a more economical production of branched chain hydrocarbons.

The gamma alumina employed in the preparation of isomerization catalysts for the present process may be derived from a number of sources. Thus, as stated above, a suitable method of preparation is by the careful thermal dehydration of any of the hydrated aluminas of the gamma system of the Haber classification (i. e. alpha alumina trihydrate, beta alumina trihydrate, and alpha alumina monohydrate). While the careful dehydration of all of these hydrated aluminas lead to the formation of gamma alumina, it is to be noted that certain aluminas are more suitable than others.

Superior forms of gamma alumina are in general prepared from hydrated aluminas which have been precipitated from a basic solution. Such aluminas may be prepared, for instance, by seeding a sodium aluminate solution with crystals of gibbsite or Bayerite, or by treating the sodium aluminate solution with carbon dioxide. Alumina prepared by dehydrating the alumina precipitated from aluminum sulfate solutions with a base, on the other hand, are inferior for the present purpose. Suitable materials consisting essentially of gamma alumina may also be prepared by carefully dehydrating certain selected bauxites.

The dehydration is carried to a point where the alumina exists essentially in the gamma form, i. e. to a water content of below 2%. Although alumina dehydrated to a water content of below 2% is suitable, it is preferred to reduce the water content to below 1%, for instance 0.5%. The temperature required to effect this dehydration and conversion to gamma alumina depends upon the time of heating, the rate of removal of the liberated water, the size of the alumina particles and the particular alumina being dehydrated. Suitable selected high grade bauxite may be dehydrated and converted into gamma alumina at temperatures between about 600° C. and 850° C., preferably at 700° C. and 750° C. "Activated Alumina" and similar materials, on the other hand, may be dehydrated and converted into gamma alumina at somewhat lower temperatures, that is, between about 500° C. and 800° C. The use of temperatures either above or below those temperatures results, in general, in catalysts of very inferior isomerizing ability. At the lower temperatures in the applicable range, the time of dehydration is considerably longer than at higher temperatures. For instance, a selected bauxite may be treated at about 600° C. for about 8–12 hours or at about 850° C. for about 1 hour. The dehydration is preferably effected while removing the liberated water, for instance with a stream of hot dry air. In some cases, it is found that the resulting catalyst is improved considerably for the isomerization process if the alumina is acid-treated prior to converting it into the gamma form. A dilute solution of hydrochloric, sulfuric or hydrofluoric acid is suitable for this purpose.

The hydrated alumina employed, although it may be (as in the case of the so-called Activated Aluminas) highly adsorptive, is a very poor adsorbent after being converted to gamma alumina. The gamma alumina is therefore not an Activated Alumina. It may be made adsorptive (activated), however, by a modified method of preparation which is also applicable. According to this modified method, the hydrated or partially hydrated alumina in a finely divided state is pilled with a combustible binder such as stearic acid or the like and then the alumina is converted to the gamma form and the binder removed simultaneously. Gamma aluminas prepared in this way may be fairly active. If the gamma alumina is prepared in this manner, it may often be impregnated with aluminum chloride vapors as described for "Activated Alumina" and yields a catalyst suitable for hydrocarbon isomerization. As stated above, however, the gamma alumina prepared by the more general method has only a poor adsorptive capacity and cannot be used to prepare comparable isomerization catalysts by this method. It is found, however, that the isomerization may be advantageously effected with gamma alumina which has been impregnated with sufficient aluminum chloride. In order to be effective in the isomerization process it is found that the gamma alumina should be impregnated with from about 15% to 40% of aluminum chloride. Catalysts containing lesser concentrations of aluminum chloride than 15% are far less active for the catalytic isomerization process. Catalysts which, on the other hand, contain more than the above-stated optimum amounts of aluminum chloride behave almost like aluminum chloride per se; that is, they have high vapor pressures, tend to sludge, and do not utilize the optimum promoting effect afforded by the alumina base. The desired aluminum chloride may be obtained by impregnating the gamma alumina with the desired amount of liquid aluminum chloride. For instance, the gamma alumina and the calculated amount of aluminum chloride may be mixed in a closed and heated rotating drum. The difference between the catalysts prepared by contacting the alumina with liquid aluminum chloride, on the one hand, and aluminum chloride vapors, on the other hand, is that in the first case the pores of the alumina are more nearly completely filled with aluminum chloride. If the amount of aluminum chloride is sufficient the catalyst particles may also have a fine outside coating of aluminum chloride.

It is to be noted that the alumina impregnated as described consists essentially of gamma alumina and as such contains less than 2% of water. (In practice the gamma alumina contains a small amount of water adsorbed from the atmosphere while handling, etc.) If the alumina contains more than 2% of water this method of preparation gives catalysts of inferior isomerization activity and life. Also, severe corrosion is encountered in preparing the catalyst and the catalyst is contaminated with corrosion products.

The impregnation of gamma alumina is preferably effected in a single step. If desired, however, it may be accomplished by a plurality of steps with lesser amounts of aluminum chloride. The contact of the gamma alumina and the molten aluminum chloride in the impregnation is preferably between about 40 minutes and 8 hours. The temperature of the impregnation is preferably between about 200° C. and about 400° C.

Catalysts consisting essentially of gamma alumina impregnated with between 15%–40% aluminum chloride as above-described are especially suitable for effecting the vapor phase isomerization of isomerizable saturated hydrocarbons and their use in this process allows a considerable advantage in the economy of the process to be realized. Due to the fact that the catalyst contains no appreciable water of constitution or hydration, the rate of decline of the isomerization conversion is materially less. This allows the isomerization to be effected over longer periods of time at practical conversion before it is necessary to apply fresh catalyst. This also affords a greater production of isomers per pound of catalyst employed. Furthermore, since substantially none of the aluminum chloride applied is destroyed by the reaction of water in the alumina the present method affords a means of materially increasing the amount of branched chain isomers produced per pound of aluminum chloride applied. Also, as explained above, the process may be effected at exceptionally high space velocities and if desired with high initial concentrations of promoter to afford a great increase in production capacity per catalytic converter. The economy of the process is furthermore increased due to the lower cost of the catalyst. Thus the catalysts employed in the present process may be prepared more cheaply due to the facts that (1) it may be prepared in a single impregnation step rather than the two-step process described above, (2) no appreciable amount of aluminum chloride is lost by reaction with water, (3) it is not necessary to remove hydrogen chloride formed by reaction of aluminum chloride with water with a consequent loss of aluminum chloride vapors as is the case when preparing catalysts with aluminas containing water, and (4) the catalyst may be prepared in apparatus constructed of ordinary cheap materials, whereas by conventional methods of catalyst preparation severe corrosion is encountered.

The following examples which are presented to illustrate certain of the advantages realizable in the isomerization according to the process of the invention are not to be construed as limiting the invention in any way.

*Example I*

This example illustrates a suitable application of the process for the isomerization of normal butane at a conventional low space velocity.

The catalyst was prepared from a gamma alumina, the source of which was an alumina trihydrate which was precipitated from a solution of sodium aluminate. This alumina trihydrate was first dehydrated at a temperature of about 250°–300° C. until it contained about 6% of firmly bound water. The partially hydrated alumina in the form of small fragments was then further dehydrated at a temperature of about 500° C. until the water content was less than 2%. The alumina which at this point was essentially gamma alumina had only a mediocre adsorptive ability. This alumina was then impregnated with liquid aluminum chloride under pressure to an aluminum chloride content of 22%.

Normal butane was isomerized using this catalyst under the following conditions:

Temperature _____ 100° C.
Pressure _____ 11 atm.
Space velocity _____ 6 mols per liter per hour
Promoter concentration _____ 2 mol % HCl The conversion to isobutane was initially about 62% and declined at a very gradual rate. At the end of about 90–100 hours of continuous operation, the conversion leveled off at about 42%.

*Example II*

This example illustrates the process of the invention using a catalyst prepared from an active gamma alumina.

The catalyst was prepared from a gamma alumina the source of which was an alumina trihydrate which was precipitated from a solution of sodium aluminate. The alumina was pilled with a combustible binder and the binder was burned out while simultaneously converting the alumina into gamma alumina. The pilled gamma alumina was quite adsorptive. The gamma alumina was impregnated with aluminum chloride by passing aluminum chloride vapors through a bed of the heated alumina pills until the concentration of aluminum chloride was 16%.

This pilled catalyst was employed in the isomerization of butane under the following conditions:

Temperature _____ 100° C.
Pressure _____ 11 atm.
Space velocity _____ 6 mols per liter per hour
Promoter _____ 3 mol % HCl The conversion to isobutane was 62% and declined slowly. Thus, after 200 hours of continuous operation the conversion was 40%.

*Example III*

This example illustrates the process of the invention using a catalyst prepared from a gamma alumina derived from a suitable bauxite.

The alumina employed was a selected bauxite sold under the name of "High Alumina Porocel." This material has the following approximate analysis: (Sample dried at about 300° C.)

| | Per cent |
|---|---|
| $Al_2O_3$ | 67–70 |
| $SiO_2$ | 8–12 |
| $Fe_2O_3$ | 7–11 |
| $TiO_2$ | 3–3.5 |
| $P_2O_5$ | 0.25 |
| MnO | 0.1 |
| CaO | 0.5 |
| MgO | 0.0 |
| Alkalies | 0–0.9 |
| $H_2O$ | 4–15 |

The alumina exists essentially as alpha alumina monohydrate. This material in the form of small pieces was dehydrated at a temperature of 700° C. for 6 hours to convert the alumina into gamma alumina. The water content was reduced to below 1%. It was then activated with about 20% aluminum chloride by impregnation with liquid aluminum chloride under pressure.

The catalyst was employed in the isomerization of butane under the following conditions:

Temperature _____ 100° C.
Pressure _____ 11 atm.
Space velocity _____ 12 mol per liter per hour
HCl promoter _____ 3 mol % for 238 hours, then 15 mol % for 154 hours The average conversion to isobutane over the 392 hours of continuous operation was 42%. This conversion at the space velocity of 12 mol per liter per hour is very high and represents a very high production capacity per volume of reactor space. The results obtained are set forth in more detail in the attached graph forming a part of this specification wherein the percentage of isobutane in the product is plotted on the ordinate and the number of mols of butane treated per volume of catalyst is plotted on the abscissa. Referring to the graph, it is seen that the conversions are high and exceptionally well sustained. It will be noted in particular that the conversion does not undergo the usual rather sudden drop during the early stages of the treatment but undergoes a substantially uniform and slower decline throughout the length of the period of use.

*Example IV*

This example does not illustrate the process of the invention but, on the other hand, illustrates the results obtained under otherwise comparable conditions using a catalyst of substantially the same composition and initial activity prepared by the best of the hitherto disclosed methods.

The catalyst employed was prepared from the same selected bauxite. Instead of converting the alumina to gamma alumina the Porocel was simply dried at 350° C. to remove all loosely bound water but leave the firmly bound water intact. The alumina, which was quite adsorptive was impregnated with aluminum chloride vapors as described in Example II to an aluminum chloride content of about 22%.

This catalyst was employed in the vapor phase isomerization of butane under the following conditions, which it will be noted compare with those used in Example III.

Temperature _____ 100° C.
Pressure _____ 11 atm.
Space velocity _____ 11 mol per liter per hour
HCl promoter _____ 3 mol % for 220 hours, then
                    15 mol % for 180 hours The conversions obtained are plotted against the mols of butane treated in the attached graph.

Referring to the graph, it is seen that although the initial conversions are very high there is a relatively rapid decline in the conversion followed by a much slower rate of decline. Comparing the areas under the curves shown for Examples III and IV, it is seen that the production capacity per given weight of catalyst is much superior in Example III.

*Example V*

As stated above, the method employed in the preparation of the catalyst used in Example III, if applied to the aluminas hitherto employed, gives inferior results. This is illustrated in the following example wherein the catalyst was prepared as in Example II with Porocel which had been dried at 250° C. and contained about 5.1% of firmly bound water. This Porocel was impregnated with molten anhydrous aluminum chloride under pressure (two parts by weight Porocel plus one part by weight aluminum chloride). The catalyst contained 23% aluminum chloride (by analysis). The catalyst was employed in the vapor phase isomerization of butane under the following conditions:

Temperature _____ 100° C.
Pressure _____ 11 atm.
Space velocity _____ 10 mols per liter per hour
HCl promoter _____ 3 mol %

The results obtained in this example which, it will be noted, is comparable with the above Examples III and IV are plotted in the attached graph. It is seen that by employing catalysts prepared from the alumina alpha monohydrate hitherto preferred, according to the method of preparation used in Example III, very inferior results are obtained.

*Example VI*

As stated above, the superior results obtained according to the process of the present invention not only depend upon the use of a substantially anhydrous gamma alumina but also upon the impregnation of the gamma alumina with a sufficient amount of aluminum chloride. This is illustrated by the following example:

A portion of selected bauxite (Porocel) was converted to substantially anhydrous gamma alumina by calcining at 700° C. until the water content was below 1% (about 0.5%). This material was then impregnated at atmospheric pressure with vapors of anhydrous aluminum chloride in the preferred manner. It was impossible, however, to produce a catalyst having an activity or production capacity approaching those illustrated in the preceding examples because the aluminum chloride content could not be raised above about 12.5%.

In the above the superiority of the process of the present invention has been illustrated with respect to the greatly increased production of branched chain hydrocarbons per given quantity of catalyst. As stated above, an important advantage of the present process is in the greatly increased yields of branched chain hydrocarbons obtainable per pound of aluminum chloride. When using selected bauxites as the source of gamma alumina the aluminum chloride is the more expensive ingredient of the catalyst and the economy of the isomerization process is directly proportional to the consumption of aluminum chloride. If the process of the invention is compared with the hitherto proposed processes on this basis, it is seen that the advantage is even more pronounced than when compared on the basis of the consumption of the compound catalyst. Thus, the production of branched chain hydrocarbons per given aluminum chloride consumption according to the process of the present invention is roughly twice that obtained when operating with catalysts prepared by the impregnation of the hitherto preferred aluminum chloride-impregnated alumina alpha monohydrate catalysts.

In the above the invention has been described with particular reference to the use of aluminum chloride catalysts. While this aluminum halide from practical considerations is preferred, it is to be understood that other aluminum halides, such in particular as aluminum bromide and mixtures of aluminum chloride with aluminum bromide or aluminum fluoride, may also be employed.

We claim as our invention:

1. In a process for the vapor phase isomerization of an isomerizable saturated hydrocarbon with an aluminum halide catalyst, the improvement which comprises passing vapors of the hydrocarbon to be isomerized under isomerizing conditions in contact with a catalyst prepared by impregnating an adsorptive alumina consisting of gamma alumina with an effective amount of an anhydrous aluminum halide to activate the gamma alumina.

2. In a process for the vapor phase isomerization of an isomerizable saturated hydrocarbon with an aluminum halide catalyst, the improvement which comprises passing vapors of the hydrocarbon to be isomerized under isomerizing conditions in contact with a catalyst prepared by impregnating an adsorptive alumina consisting of gamma alumina with an effective amount of aluminum chloride to activate the gamma alumina.

3. In a process for the vapor phase isomerization of an isomerizable saturated hydrocarbon with an aluminum halide catalyst, the improvement which comprises passing vapors of the hydrocarbon to be isomerized under isomerizing conditions in contact with a catalyst prepared by impregnating an adsorptive alumina consisting of gamma alumina with from between 15% to 40% by weight of aluminum chloride.

4. In a process for the vapor phase isomerization of butane with an aluminum halide catalyst, the improvement which comprises passing butane under isomerizing conditions in contact with a catalyst prepared by impregnating an adsorptive alumina consisting of gamma alumina with an effective amount of anhydrous aluminum halide to activate the gamma alumina.

5. A process according to claim 1 wherein the adsorptive alumina consisting of gamma alumina contains less than 1% by weight of water.

6. A process according to claim 1 wherein the adsorptive alumina consisting of gamma alumina contains about 0.5% by weight of water.

7. In a process for the vapor phase isomerization of butane with an aluminum chloride catalyst, the improvement which comprises passing butane under isomerizing conditions in contact with a catalyst prepared by impregnating an adsorptive alumina consisting of gamma alumina with an effective amount of aluminum chloride to activate the gamma alumina.

8. In a process for the vapor phase isomerization of butane with an aluminum chloride catalyst, the improvement which comprises passing butane under isomerization conditions in contact with a catalyst prepared by impregnating an adsorptive alumina consisting of gamma alumina with between 15% and 40% of aluminum chloride.

MARTIN DE SIMO.
FRANK M. McMILLAN.